United States Patent [19]

Teraoka et al.

[11] 4,101,366
[45] Jul. 18, 1978

[54] ELECTRONIC DIGITAL DISPLAY SCALE WITH LABEL PRINTER

[75] Inventors: Kazuharu Teraoka; Kazuo Nishimura, both of Tokyo, Japan

[73] Assignee: Teraoka Seikosho Co., Ltd., Tokyo, Japan

[21] Appl. No.: 663,931

[22] Filed: Mar. 4, 1976

[30] Foreign Application Priority Data

Sep. 4, 1975 [JP] Japan .................. 50-107207
Dec. 23, 1975 [JP] Japan .................. 50-153782

[51] Int. Cl.² .............................. G01G 19/413
[52] U.S. Cl. .................. 156/378; 156/384; 177/3; 177/12; 177/5; 177/13; 177/9; 235/58 P; 235/92 WT; 235/58 PS; 346/10; 346/11
[58] Field of Search ............. 156/249, 277, 285, 497, 156/344, 542, 360, 363, 566, 378, 568, 384, 584, 387, DIG. 33, 556; 53/137; 235/92 WT, 58 P, 58 S; 346/9, 11, 10; 177/3, 9, 4, 12, 5, 13, 8

[56] References Cited

U.S. PATENT DOCUMENTS

| | | | |
|---|---|---|---|
| 2,521,827 | 9/1950 | Carter | 156/572 |
| 2,860,867 | 11/1958 | Allen et al. | 177/3 |
| 2,948,466 | 8/1960 | Allen et al. | 156/360 |
| 3,059,709 | 10/1962 | Karp | 346/9 |
| 3,104,806 | 9/1963 | Allen | 177/3 |
| 3,169,895 | 2/1965 | John | 156/363 |
| 3,232,815 | 2/1966 | Klopfenstein et al. | 156/566 |
| 3,372,079 | 3/1968 | Fellner et al. | 156/360 |
| 3,447,992 | 6/1969 | Allen et al. | 156/363 |
| 3,556,898 | 1/1971 | Allen | 156/384 |
| 3,577,296 | 5/1971 | Phillips et al. | 156/277 |
| 3,662,511 | 5/1972 | Eliasberg | 156/360 |
| 3,713,949 | 1/1973 | Binter | 156/566 |
| 3,751,322 | 8/1973 | Schulz | 156/360 |

*Primary Examiner*—David Klein
*Assistant Examiner*—J. J. Gallagher
*Attorney, Agent, or Firm*—William Anthony Drucker

[57] ABSTRACT

An electronic digital display scale with a label printer adapted to weigh an article, to print a measured weight of said article on a label and to adhere said label onto said article weighed, wherein the printed label is held by a label transfer device by means of adhering or suction and transferred to an applying position outside a frame, thereby said label is applied to the weighted article by depressing said weighed article against the label retained by said label transfer device.

3 Claims, 11 Drawing Figures

ELECTRONIC DIGITAL DISPLAY SCALE WITH LABEL PRINTER

SUMMARY OF THE INVENTION

The present invention relates to an improvement of an electronic digital display scale with a label printer adapted to print a weight of an article which is weighed on a label and to apply said printed label onto said article weighed.

In recent years, along with a remarkable development of the distribution systems in various industries, a number of kinds of goods are handled in great quantities in many places such as department stores and super market stores. Among these goods, there are some kinds of goods like foodstuff goods which are to be sold after weighing and calculating prices. In most cases, these kinds of goods are packed after their weights and prices have been measured and calculated in advance and labels on which the unit price, weight, price, name of article are printed are applied onto packed goods. Therefore, it has been necessary to print a number of such labels and lately the label printers which are used in connection with electronic scales have been developed and put in practical use to fill the requirements of users described above. Said electronic scale converts an amount of mechanical displacement corresponding to the weight of an article (goods) into a specified number of pulse singals through an A-D converter and the weight of said article is computed by counting through a counter and is digitally indicated. There is another type of the electronic scale in which the unit price of article is inputted into the scale by operating a unit price setting key etc. and the weight of the article is weighed when said article is put on the scale plate of the electronic scale and is anto-matically computed and displayed through multiplication of the measured weight of the article by the preset unit price. The label printer which is to be connected for use with said electronic scale is provided with a roll paper for preparing labels, printing device etc. in its main body. Therefore, when the article is weighed and the price is calculated after the unit price has been set in the electronic scale as described above, the weight, price, name etc. of the article are printed on the roll paper for the label by the printing device in the label printer. The label on which necessary items are printed is transferred to a predetermined position and applied onto the article weighed. In this applying operation, it is inefficient and troublesome for users to manually handle each label and transfer it.

The present invention is intended to improve the mechanism described above.

The first object of the present invention is to provde an electronic digital display scale with a label printer permitting easy and positive transfer of the printed label to the label applying position without manual handling of each printed label and easy and efficient application of following printed labels and having a simple construction which can be made at an economical cost.

The second object of the present invention is to provide an electronic digital display scale with a label printer in which the printed label is transferred to the applying position above the scale plate of said electronic scale outside the frame by depressing the label transfer device onto the adhesive surface of said printed label and is adhered on said weighed article by depressing the weighed article against the printed label which is transferred to the specified applying position.

The third object of the present invention is to provide an electronic digital display scale with a label printer in which the printed label is sucked by a label suction member while the adhesive surface of the label is kept faced outward and is transferred to the label applying position above the plate of said scale outside the frame, and when the weighed article is depressed against the printed label which is retained by the label suction member and taken away from the label suction member, the label is applied onto the weighed article.

DETAILED DESCRIPTION OF THE INVENTION

Figure 1:
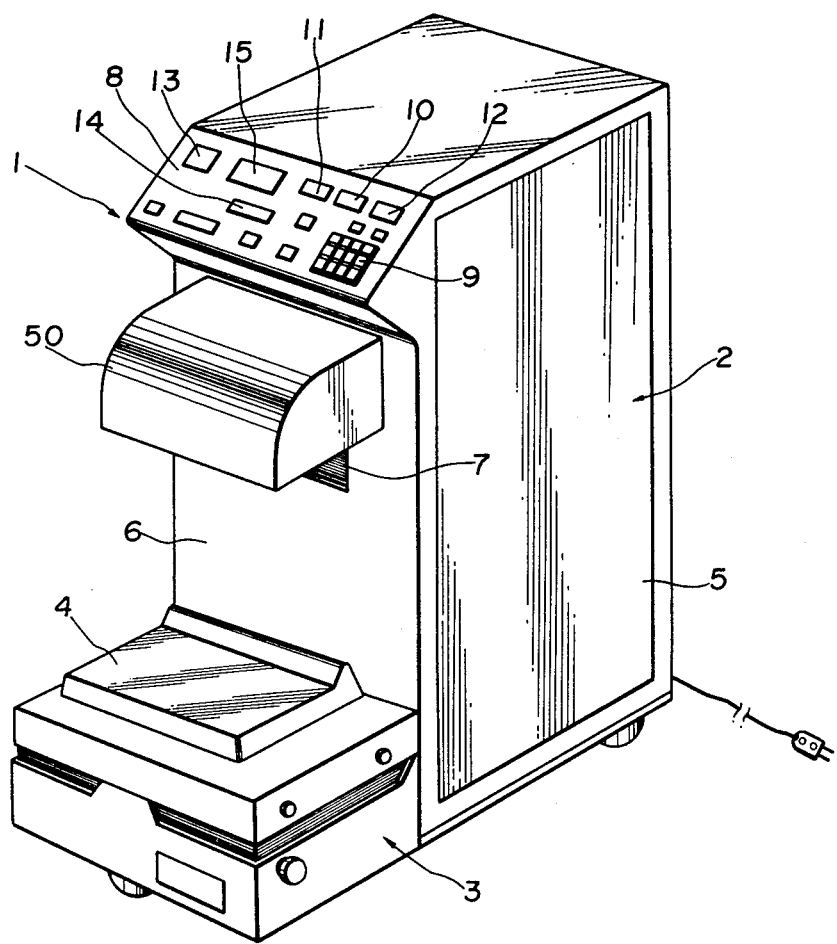
FIG. 1 is a perspective view of the electronic digital display scale with a label printer which is provided with the first embodiment of the present invention.
Figure 2:
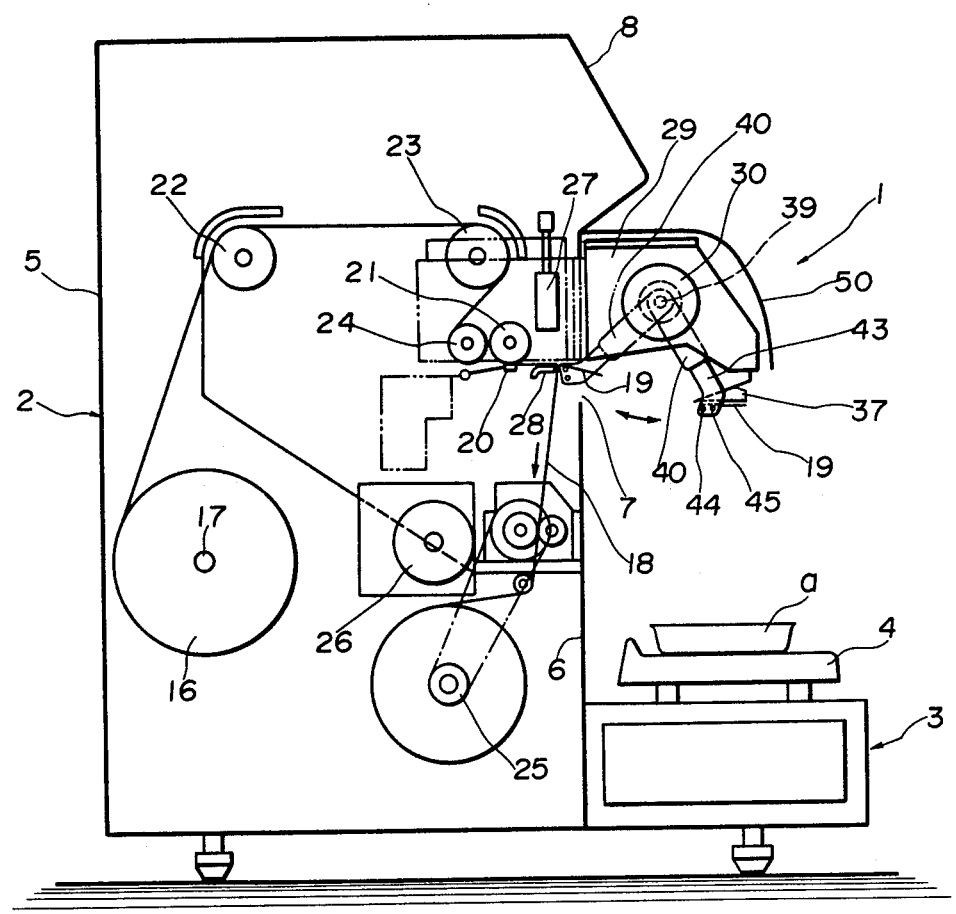
FIG. 2 is a longitudinal, sectional view of a sketch illustrating said first embodiment.

Referring to FIGS. 1 to 4, the following describes in detail the first embodiment. In FIGS. 1 and 2, there is shown electronic digital display scale 1 provided with the first embodiment in accordance with the present invention. This electronic digital display scale comprises label printer 2 and electronic scale proper 3 which is disposed at a front lower part of said label printer 2. These component devices are electrically connected and scale plate 4 of said electronic scale proper 3 is provided at the lower front side of label printer frame 5. Label take-out opening 7 is provided at the center of the front face 6 of said label printer frame 5 and operating display section 8 is formed at the upper sloped surface of said front face 6, thereon provided with ten keys 9 for setting the unit prices, unit price displaying section 10 weight indicating section 11, price indicating section 12, label counter 13, process date setting dial 14, process date indicating section 15 etc. In said label printer frame 5, roll paper 16 is supported by shaft 17 and consists of long and thin waste base paper 18 and labels which are cut in a specified size and detachably applied onto said base paper 18 at certain specified intervals. Moreover, there are provided a group of guide rollers 22, 23 and 24 which guide said roll paper 16 to the printing mechanism comprising printing hammer 20 and printing drum 21, roller 25 for taking up said base paper 18, paper feed motor 26 which feeds out roll paper 16 in sequence, rubber printing mechanism 27 for printing the name of article and other items, etc. When base paper 18 is pulled lower than guide plate 28 after label 19 adhered to the upper surface of base paper 18 has been printed, printed label 19 is detached from base paper 18 and advanced to label take-out opening 7. In this case, the adhesive surface of label 19 is faced down.

Figure 3:
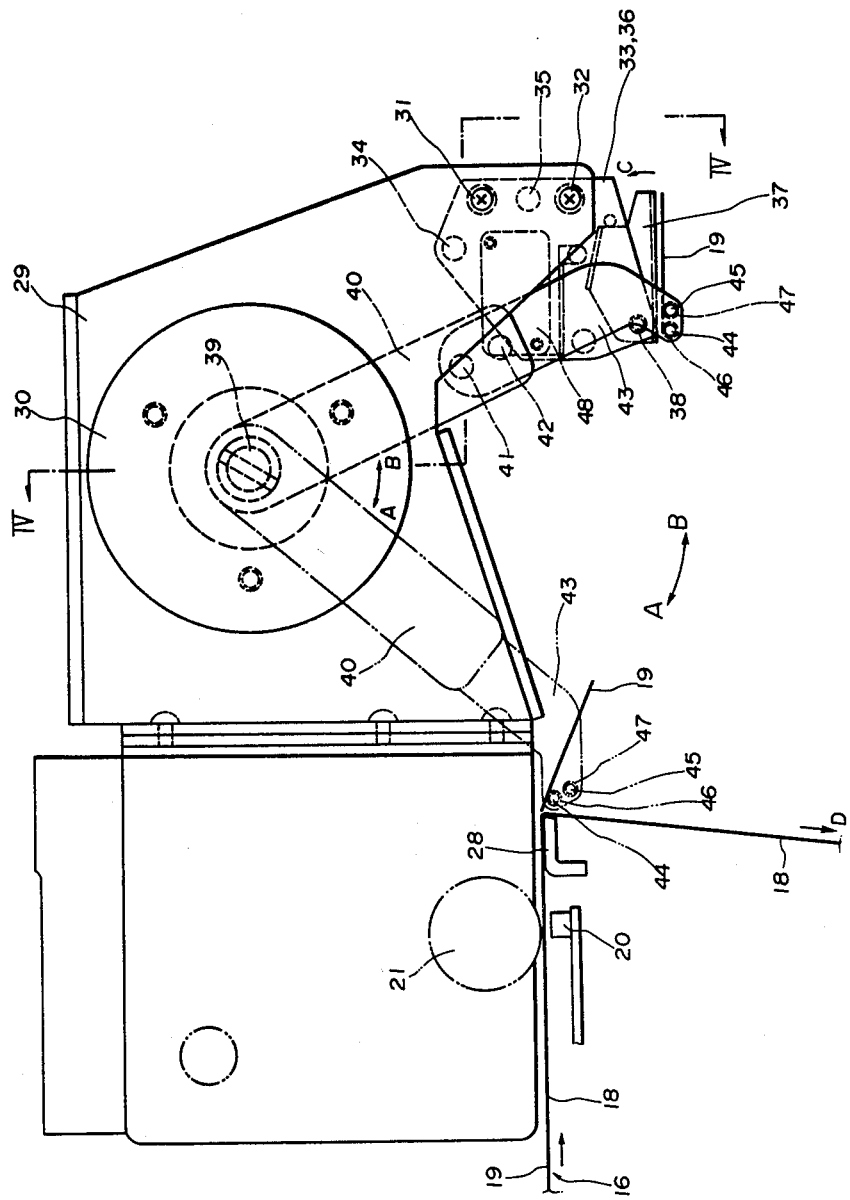
FIG. 3 is a magnified side view of label transfer device based on said first embodiment and an arrow view along line III — III shown in FIG. 4.
Figure 4:
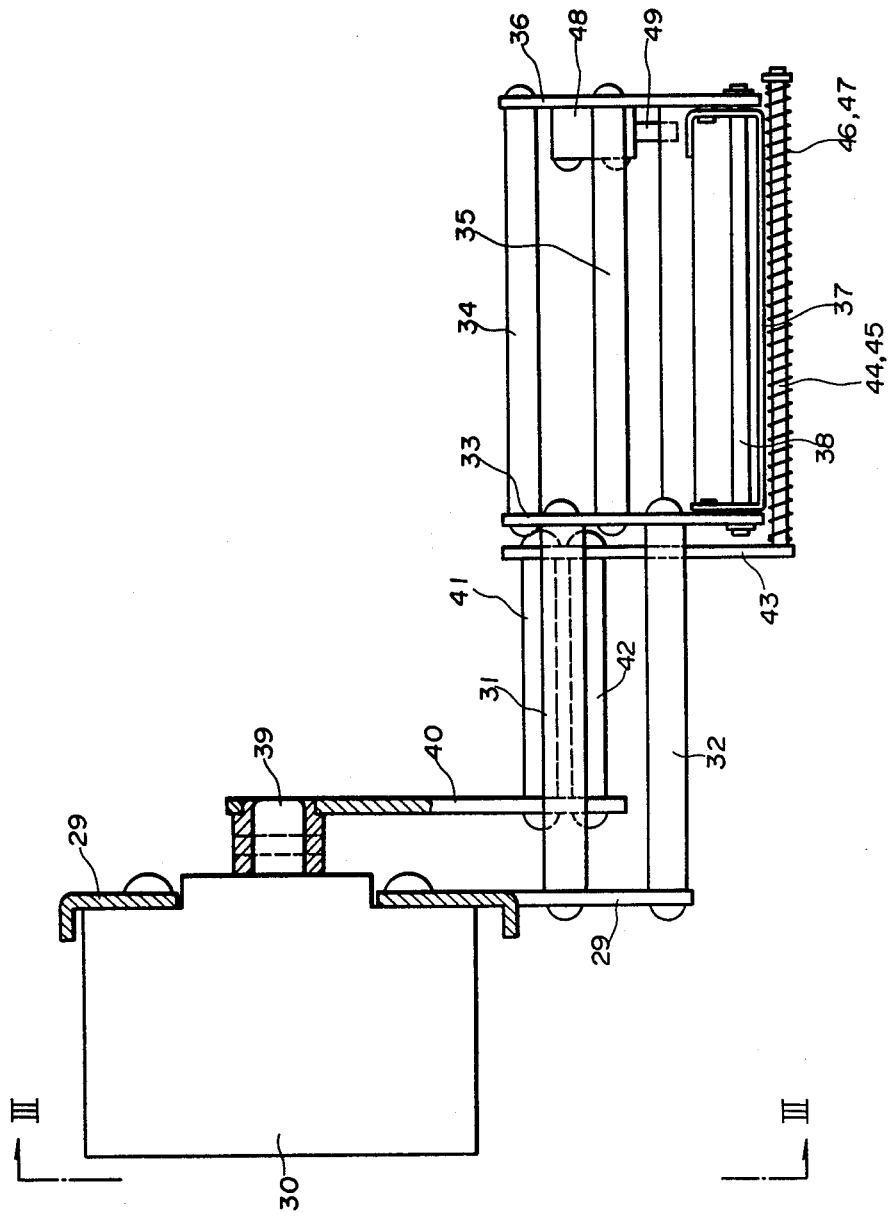
FIG. 4 is a sectional view along line IV — IV shown in FIG. 3.

Referring to FIGS. 3 and 4, the following describes the label transferring section.

Rotary solenoid 30 is fixed at the center of side plate 29 fixed to label printer frame 5, a setting plate 33 is fixed to the lower and part of said side plate 29 through both connecting rods 31 and 32, other side plate 36 is fixed to said setting plate 33 through both connecting rods 34 and 35 and both said setting plates 33 and 36 are opposed each other with a distance. Both end parts of receiving plate 37 near its lateral side are rotatably fixed to the lower parts of both said setting plates 33 and 36 through shaft 38. This receiving plate 37 is usually positioned almost horizontally above said scale plate 4 as shown with a solid line in FIG. 3 and, when said receiving plate 37 is pushed at its lateral side, receiving plate 37 can be moved upward around shaft 38 as a fulcrum. The upper end part of swing plate 40 is secured at shaft 39 of said rotary solenoid 30, other swing plate 43 is secured at the lower part of said swing plate 40 through both connecting rods 41 and 42 and each one and of two label transfer bars 44 and 45 which are provided in a horizontal direction is secured at the lower end part of swing plate 43. Moreover, coil springs 46 and 47 are rotatably mounted to the peripheries of said label transfer bars 44 and 45 and both said label transfer bars 44 and 45 swing in reciprocative motion in the direction of arrow A↔B when solenoid 30 is actuated. When label transfer bars 44 and 45 move to A, label transfer bar 44 stays at a position a little below said guide plate 28 as shown with a two-dot broken line in FIG. 3 and label 19 detached from base paper 18 is adhered onto coil spring 46 mounted on the periphery of label transfer bar 44. When both said label transfer bars 44 and 45 move to B, label 19 adhered to coil spring 46 of label transfer bar 44 is transferred to a position immediately below receiving plate 37 as shown with a solid line in FIG. 3 while being kept almost horizontal. Limit switch 48 is fixed to said setting plate 36 and connected with said solenoid 30 and the printing mechanism. Furthermore, operating element 49 of said switch 48 is provided with a small distance from said receiving plate 37 above thereof. When said receiving plate 37 is moved upward, it depresses said operating element 49, rotary solenoid 30 rotates in the direction of arrow A, both label transfer bars 44 and 45 stay at the positions shown with a two-dot broken line in FIG. 3 and a next printing instruction is given to the printing mechanism. Cover 50 is shown in the figure.

The following describes the operation of the electronic digital display scale with the label printer which comprises as so far described.

The date of process is set by dial 14 and the rubber stamp with the name of article engraved thereon for preparing labels is mounted on rubber printing mechanism 27 while, when the unit price is inputted in the electronic scale by operating ten keys 9, this set unit price is displayed in terms of digits by unit price displaying section 10. When pack "a" containing said article is put on scale plate 4, the weight of article is automatically weighed by electronic scale proper 3, digitally displayed at weight displaying section 11, said set unit price and weight of the article, are multiplied by the computing section (not shown) and the price is calculated and displayed digitally on price displaying section 12. When the weight and price of the article are thus calculated, a printing instruction is transmitted to the printing device comprising printing hammer 20, printing drum 21, etc., rubber printing mechanism 27, etc., the unit price, weight, price, date of process, name etc. of the article are printed on label 19 adhered to the upper surface of base paper 18. The base paper 18 is pulled in the direction of arrow D when the printing ends and printed label 19 is transferred from the top end of guide plate 28 to label take-out opening 7 side while being detached from base paper 18. Detached label 19 is adhered to coil spring 46 which is mounted on the periphery of label transfer bar 44 staying in front of and slightly below guide plate 28 as shown with a two-dot broken line in FIG. 3 while said coil spring 46 is gradually rotated. When said printed label 19 is detached from base paper 18 and completely transferred, the side part of the adhesive surface of said label 19 is adhered to and retained by said coil spring 46 as shown in FIG. 3 and, at the same time rotary solenoid 30 is actuated by said label feed end signal and shaft 39 of rotary solenoid 30 rotates in the direction of arrow B. Then label transfer bars 44 and 45 move in the direction of arrow B through both swing plates 40 and 43 secured on said shaft 39 and printed label 19 which is adhered to coil spring 46 of label transfer bar 44 is transferred and stays in horizontal position just below receiving plate 37 while keeping its adhesive surface faced down as shown with solid line in FIG. 3. When weighed pack "a" on scale plate 4 is lifted up by hand and the upper surface of said pack "a" is depressed against said label 19, the adhesive surface of label 19 is adhered onto the upper surface of pack "a" since label 19 is depressed against receiving plate 37. In this case, receiving plate 37 is also pushed to swing upwardly around shaft 38 as the fulcrum and depress operating element 49 of limit switch 48, thereby said rotary solenoid is rotated in the direction of arrow A, both label transfer bars 44 and 45 move again to the position shown by the two-dot broken line in FIG. 3 to be ready for a subsequent label and a next printing signal is given to the printing mechanism.

Subsequent label adhering operation is performed by repeating the procedure explained above.

As described in detail in the foregoing, in the first embodiment of the present invention, the printed label is transferred to the label applying position above the scale plate located outside the frame by adhering the label transfer device to the adhesive surface of said printed label and the label is applied onto the weighed article by depressing the weighed article against the printed label. Accordingly, the printed label can be easily and steadily transferred to the label applying position above the scale plate by adhering the label transfer device to the adhesive surface of the printed label without manually handling individual printed labels. After transfer of the label, it can be applied onto the weighed article by manually lifting up the weighed article from the scale plate and depressing the article against the printed label retained above the article, thus permitting easy and efficient application of the label. Moreover, since the label is transferred by being adhered to the label transfer device, any special device for holding the label is not required and the electronic scale can be comparatively simplified and easily manufactured at an economical cost.

In the above embodiment, the label printer and the electronic scale proper are adjacently arranged but the label printer and the electronic scale proper can be arranged at remote positions and electrically connected. The label transfer bars can be fitted to the moving plate which reciprocates in an almost horizontal direction instead of said swing plate and a motor or the like can be used as the source of driving force for these devices instead of the solenoid.

In case of said embodiment, the receiving plate is secured at the setting plate but it can be secured at the swing plate. In other words, the label transfer bar is secured at the lower part of the swing plate which is rotatably secured at its upper part so that the label transfer bar may be moved in a vertical direction. This label transfer bar is connected with the solenoid valve etc., the receiving plate provided with a small distance above from said label transfer bar is fitted to said swing plate, and the printed label is inserted between said label transfer bar which stays at the label printer side and the receiving plate, then the label transfer bar is moved to the receiving plate side by said solenoid valve, the adhesive surface of the printed label which is kept inserted between the label transfer bar and the receiving plate is applied outo the label transfer bar and, in this state, the label transfer bar, label and receiving plate are moved altogether to the label applying position outside the frame. Thus, the label is moved firmly held and can be steadily transferred to the predetermined position without falling off from the label transfer bar during transfer.

Figure 5:
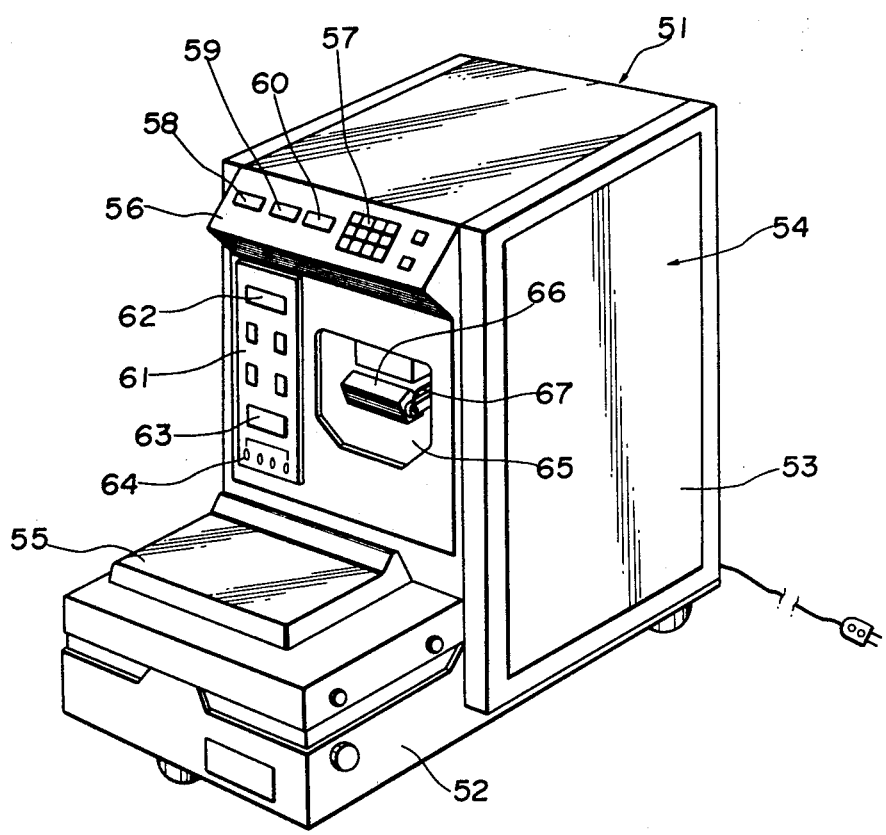
FIG. 5 is a perspective view of the electronic digital display scale with a label printer which is provided with the second embodiment of the present invention.
Figure 6:
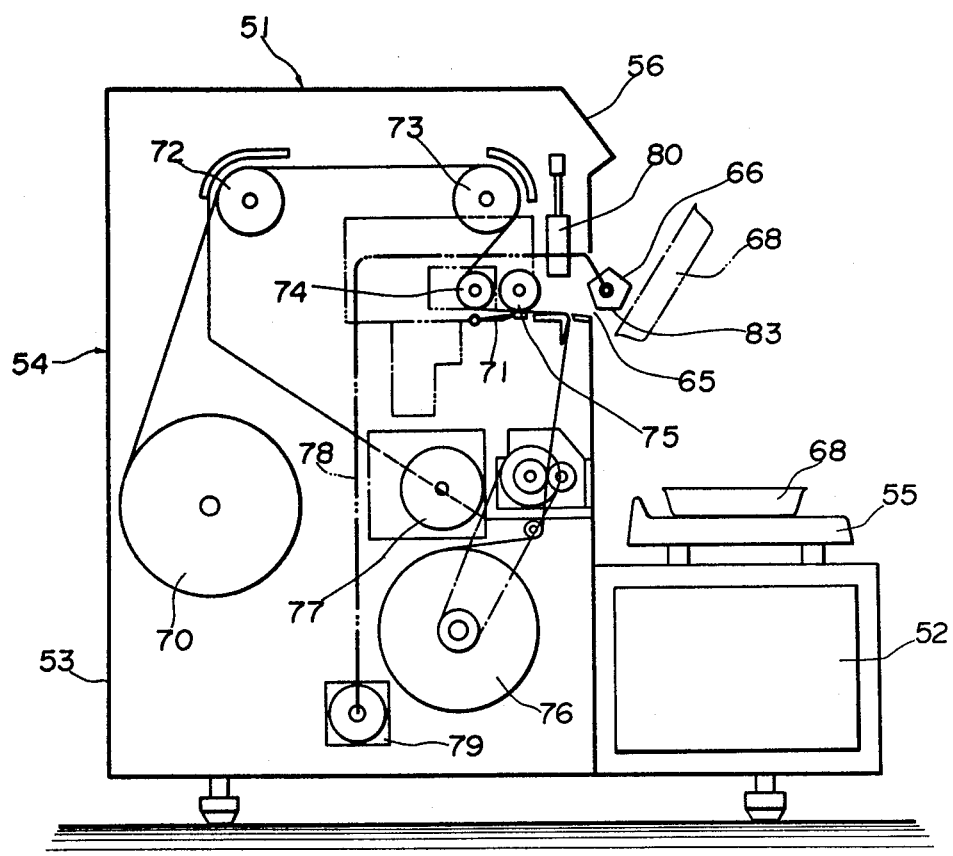
FIG. 6 is a longitudinal, sectional view of a sketch illustrating said second embodiment.
Figure 7:
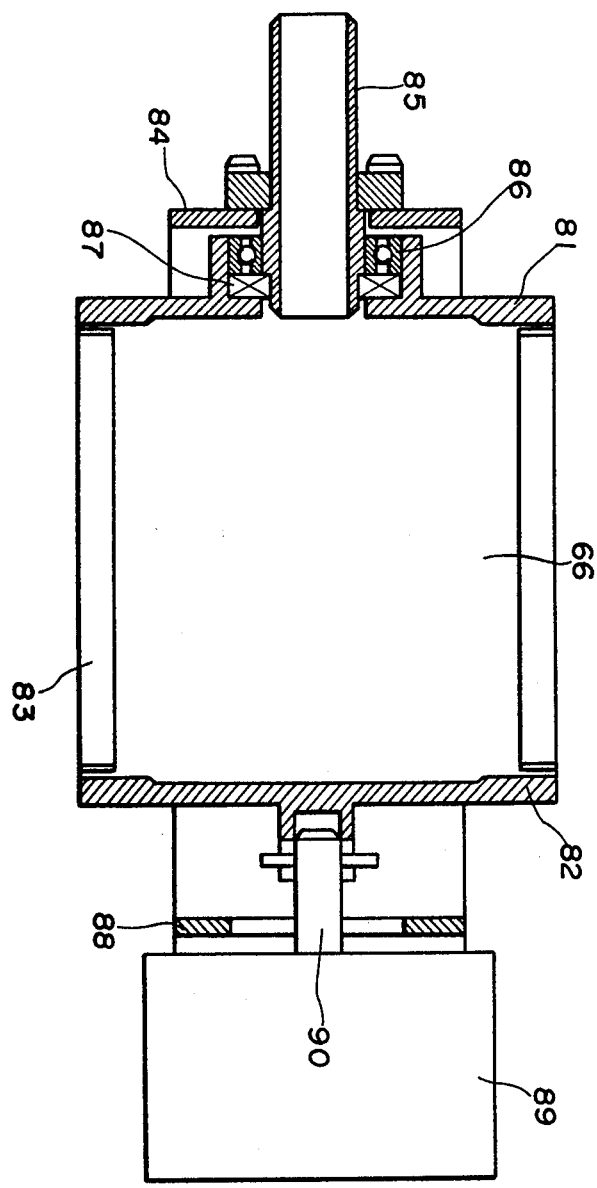
FIG. 7 is a magnified longitudinal, sectional view of the label suction member based on said second embodiment.

Referring to FIGS. 5 to 7, the following describes the second embodiment in accordance with the present invention. In FIGS. 5 and 6, there is shown electronic digital display scale with a label printer 51. In case of this embodiment, electronic scale 52 and label printer 53 are unitized and built in one case proper 54. Scale plate 55 of electronic scale 52, and No. 1 and No. 2 operation display sections 56 and 61 are provided at the front side of case proper 54, label take-out opening 65 is arranged obliquely above scale plate 55 and label suction member 66 which sucks and transfers the printed label is provided in the vicinity of said label take-out opening 65. This is described in detail later. Ten keys 57 for setting the unit price, unit price displaying section 58, weight displaying section 59, price displaying section 60 etc. are arranged on said No. 1 operation displaying section 56. Label counter 62, dial 63 for setting the date of process, printing selector switch 64 for selecting manual, semiautomatic or automatic operation and repetitive printing of the same contents etc. are arranged on said No. 2 operation displaying section 61. Label printer 53 in case proper 54 is provided with roll paper 70 for preparing labels, a group of guide rollers 72, 73 and 74 which guides the paper from roll paper 70 to the printing device comprising printing hammer 71 and printing drum 75, roller 76 for the waste base paper which takes up the base paper from which labels have been detached, paper feed motor 77 for feeding out the paper from roll paper 70, label suction motor 79 which is connected to said label suction member 66 with pipe 78, rubber printing mechanism 80 for printing the name of article and other items on labels, etc.

Referring to FIG. 7, the following describes in detail said label suction member 66. Both side ends of pentagonal tubular label suction member 66 are closed by closing plates 81 and 82, the lower surface of said label suction member 66 is opened at its center and a wire net is attached to this opening, thus forming suction port 83. Furthermore, hollow shaft 85 is supported by supporting plate 84 fixed at said case proper 54, one closing plate 81 is mounted on shaft 85 at the center of said closing plate 81 through bearing 86 so that said label suction member 66 can rotate, and one side end of the hollow part of said hollow shaft 85 is air-tightly communicated with the interior of said label suction member 66 through oil seal 87 while the other side end of the hollow part of said hollow shaft 85 is communicated with motor 79 for sucking the label through said pipe 78. When the interior of label suction member 66 is evacuated by said motor 79 for sucking the label, the label is sucked by suction port 83. In this case, the suction force is slightly greater than the adhering force of the adhesive agent applied to the rear surface (opposite to the sucked surface) of the label. Other supporting plate 88 provided to oppose with a distance to said supporting plate 84 is fixed at said case proper 54, rotary solenoid 89 is fixed at said other supporting plate 88 and operating shaft 90 of said rotary solenoid 89 is supported through the center of other closing plate 82 of said label suction member 66 whereby said label suction member 66 is adapted to reciprocatively rotate at a specified angle for each operation by said rotary solenoid 89 in a direction or an opposite direction.

The following describes the operation of the electronic scale with a label printer which is constructed as described above. The date of process is set by dial 63, a desired printing mode is set by operating switch 64 and the rubber stamp for a desired article for which the label is to be prepared is mounted in rubber printing mechanism 80; then, when the unit price is inputted in the electronic scale by operating the ten keys 57, the unit price is displayed digitally at unit price displaying section 58. When a pack of weighed article 68 containing said article is put on scale plate 55, the weight of said pack is automatically weighed and displayed digitally at weight displaying section 59. At the same time, the set unit price and weight are multiplied in the computing section and the price is calculated and displayed digitally at price displaying section 60. When the weight and price are thus calculated, a printing instruction is sent to printing hammer 71, rubber printing mechanism 80 etc. and the unit price, weight, price, date of process and name of the article are printed on roll paper 70. When motor 79 for sucking the label is driven, the interior of label section member 66 is evacuated, through pipe 78 and hollow shaft 85 and the label is sucked by suction port 83 formed at the lower surface of label suction member 66. When the label on which necessary items are completely printed reaches below label suction member 66, this label is detached from the base paper and sucked onto suction port 83 of label suction member 66. When the suction is completed, rotary solenoid 89 is actuated by a signal from the label printer and label suction member 66 is rotated to a specified angle by operating shaft 90 of said rotary solenoid 89. At this time, the label sucked by said label suction member 66 is kept slightly projected outwardly from label take-out opening 65 and stays at the label applying position above scale plate 55 located outside case proper 54. Then weighed article 68 put on scale plate 55 is lifted up and depressed against the label sucked by said label suction member 66. Since an adhesive agent is applied onto the outside surface of the label, the label is applied onto weighed article 68. When weighed article 68 is taken away from said label suction member 66, the label is detached from label suction member 66 due to the adhering force of the label which is larger than the suction force by which the label is sucked by the label suction member. Accordingly, as described above, the printed label is transferred to the label applying position by sucking it onto label suction member 66 without manually transferring and applying each label and can be applied onto weighed article 68 merely by depressing said weighed article against the printed label and taking the article away from the label suction member 66. The suction force need not be adjusted and the label applying operation is very easy and efficient since the suction force can always be kept effective during operation. When weighed article 68 is depressed against the label, weighed article 68 presses the operating element of the limit switch which is projected at label suction member 66 to cause said rotary solenoid 89 to be actuated and label suction member 66 to return the home position.

As described above, in the second embodiment in accordance with the present invention, the printed label is sucked by the label suction member while its adhesive surface is kept faced outward and transferred to the label applying position above the scale plate outside the frame, and the label is applied outo the weighed article by depressing the weighed article against the printed label sucked by the label suction member and taking said weighed article away from the label suction member.

Accordingly, the printed label need not be manually handled and can be applied onto the weighed article and detached from the label suction member without adjusting the suction force at the label suction member. Thus, label applying operation can be easily and efficiently performed and the apparatus is comparatively simple in construction and can be manufactured at an economical cost.

FIGS. 8 to 11 show another embodiment of a moving mechanism for the label suction member. The following describes this embodiment. In the figures, the upper end part of swing plate 91 is secured at the supporting plate projected from front panel of said case proper 54, a square tubular label suction member 93 is fitted to the lower end of said swing plate 91, a suction port (not shown) is provided at the lower end surface of label suction member 93 and the label is sucked by said suction port and transferred.

Figure 8:
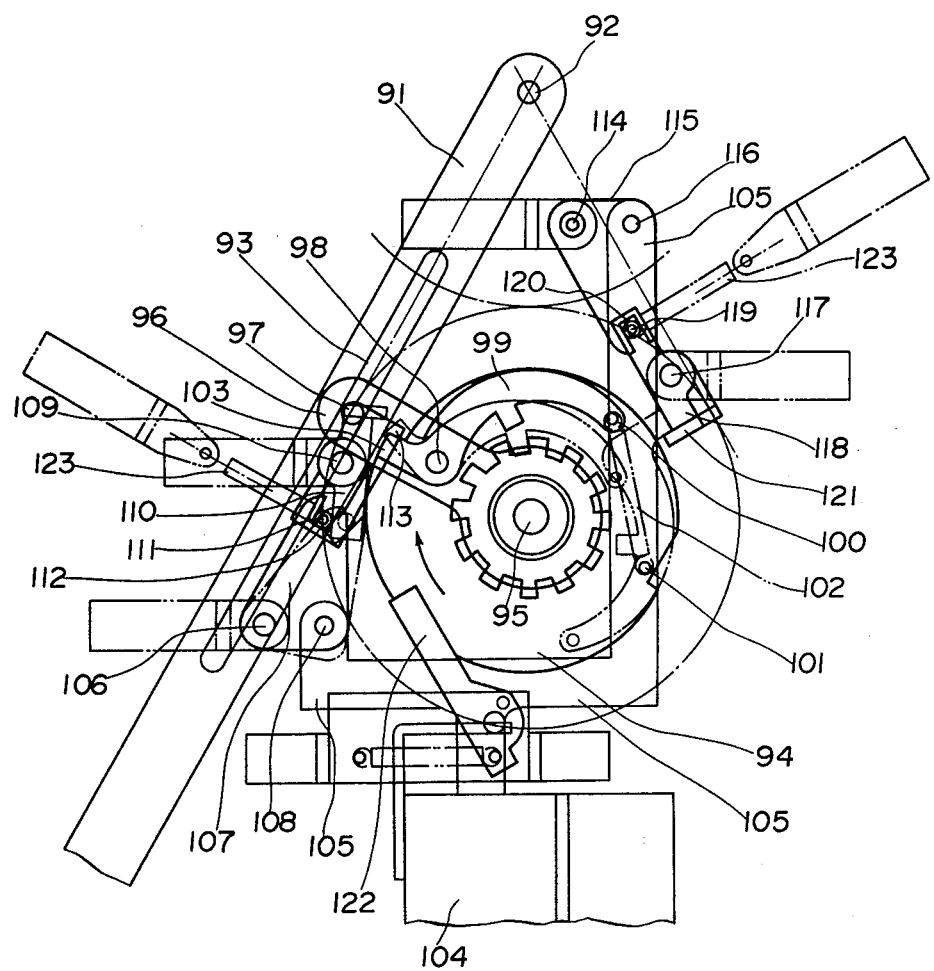
FIG. 8 is a front view of a sketch illustrating another embodiment of a driving mechanism of the label suction member.
Figure 9:
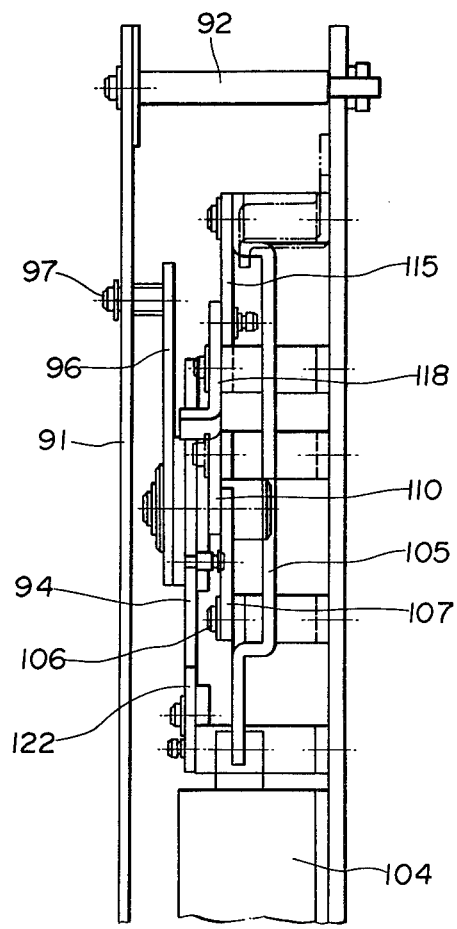
FIG. 9 is a right-handed side view of said second embodiment.
Figure 10:
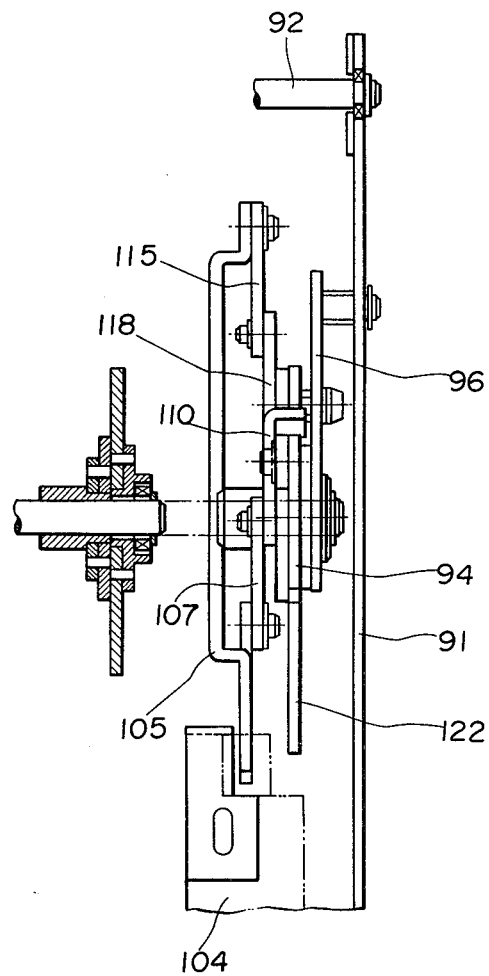
FIG. 10 is a left-handed side views of said second embodiment.
Figure 11:
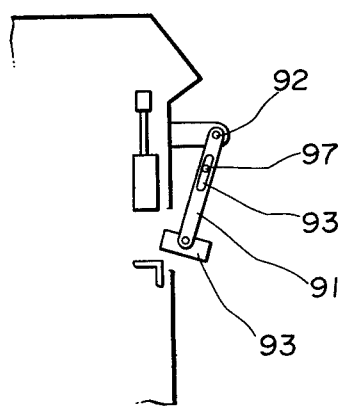
FIG. 11 is a longitudinal, sectional view with partial omission, illustrating the label suction member of the driving mechanism of said second embodiment.

Referring to FIGS. 8 to 10, the following describes in detail the label transfer mechanism. Thin and long engaging groove 93 is provided along the lengthwise direction at the center of said swing plate 91. Rotary plate 94 rotates in the arrow direction around shaft 95 as the center, other rotary plate 96 which rotates around said shaft 95 as a fulcrum is coupled to said rotary plate 94, and pin 97 projected at the extreme end part of said other rotary plate 96 is engaged with engaging groove 93 of said swing plate 91 so that said pin 97 can move in said engaging groove 93 in the lengthwise direction. When other rotary plate 96 rotates in the arrow direction, pin 97 causes swing plate 91 to swing at a specified angle while moving in engaging groove 93 in the lengthwise direction.

Engaging plate 99 is rotatably secured at said rotary plate 94 through pin 98, tension spring 102 is hooked between pin 100 projected at one end part of said engaging plate 99 and pin 101 projected at said rotary plate 94 and engaging part 103 is formed at the other end part of said engaging plate 99. Operating plate 105 is fixed at the operating shaft of automatic resetting type solenoid 104 and, when said solenoid 104 is actuated by the printing end signal or an instruction of the limit switch (not shown), siid operating plate 105 moves down and returns to the home position (shown with a solid line) with lapse of a certain period of time. One end of one link 107 which is rotatably secured on shaft 106 is coupled to one upper end of said operating plate 105 through pin 108, pin 111 is projected at the lower end part of one engaging claw 110 which is rotatably secured on shaft 109 at its center, said pin 111 is engaged with engaging groove 112 formed at the upper part of said link 107 and claw part 113 provided at the upper part of said engaging claw 110 is remountably engaged with engaging part 103 of said engaging plate 99. Similarly, the other end of other link 115 which is rotatably secured on other shaft 114 is coupled through pin 116 to the other upper end of said operating plate 105, pin 119 is projected at the upper end part of other engaging claw 118 which is rotatably secured on shaft 117 at its center, said pin 119 is engaged with engaging groove 120 provided at the lower part of said other link 115, and claw 121 provided at the lower part of other engaging claw 118 is remountably engaged with engaging part 103 of said engaging plate 99. In the figure, there are shown ratchet claw 112 which prevents reverse rotation of one rotary plate and automatic solenoid resetting spring 123.

The following describes the operation of the moving mechanism for the label suction member constructed as described above. The printed label is sucked by label suction member 93 fitted to the lower end part of swing plate 91 which is positioned as shown with a solid line in FIG. 8. When solenoid 104 is operated by the printing end signal, operating plate 105 moves down, the lower part of one link 107 is pulled down by said operating plate 105 through pin 108, said link 107 rotates around shaft 106 as a fulcrum and one engaging claw 110 rotates aroung he shaft as a fulcrum. Since claw part 113 of engaging claw 110 disengages plate 99 secured to rotary plate 94 from engaging part 103 of engaging plate 99, other rotary plate 96 rotates together with said rotary plate 94 in the arrow direction. Then, pin 97 projected at the extreme end part of other rotary plate 96 moves along engaging groove 93 of swing plate 91 and swing plate 91 swings around shaft 92 as a fulcrum to transfer the label sucked by label suction member. Since said solenoid 104 is automatically reset by means of spring 123, engaging plate 99 is released from engagement and is slightly moved, and operating plate 105 moves up to return to the home position. When said rotary plate 94 rotates and engaging part 103 of engaging plate 99 secured to said rotary plate 94 reaches the position of claw part 121 of other engaging claw 118, engaging part 103 engages with claw part 121, rotary plate 94 stops and the label sucked by label suction member 93 secured to the lower end part of swing plate 91 stays at the label applying position above the scale plate. When the weighed article is depressed against the label sucked by said label suction member 93, the label is applied onto said weighed article. At this time, the weighed article pressed the limit switch provided at the label suction member when it is depressed against the label, said solenoid 104 is actuated and operating plate 105 is moved upward. Then other link 115 is pulled down by said operating plate 105 through pin 116, and other link 115 rotates around shaft 114 as a fulcrum, other engaging claw 118 rotates around shaft 117, and claw part 121 of said engaging claw 118 disengages engaging plate 99 from engaging part 103 to cause both rotary plates 94 and 96 to rotate and swing plate 91 to rotate in a direction opposite to the direction of rotation of said rotary plates. When engaging part 103 of engaging plate 99 engages with claw part 113 of said engaging claw 110, these plates stop, said label suction member 93 returns to the hope position and the printed labels are thus transferred in sequence to the label applying position through repetition of the above-mentioned operations.

As described above, the present invention permits easy and accurate transfer of printed labels to the label applying position outside the frame without manually handling said printed labels, easy and efficient application of the printed labels onto the weighed articles and economical manufacture of the electronic digital display scale having simple construction.

What is claimed is:

1. An electronic digital display scale with a label printer having a printing mechanism adapted to print a weight and other information of an article which is weighed and adhere said label to said weighed article, wherein a printed label is held and transferred to a label applying position above a scale plate located outside a frame by adhering a label transfer device to an adhesive surface of the label and is applied onto said weighed article by depressing the weighed article against the label adhered to said label transfer device comprising:
   a driving mechanism fixed at the center of a side plate which is fixed to a label printer frame;
   a first setting plate fixed to the lower part of said side plate through two connecting rods;
   a second setting plate opposed to said first setting plate through two connecting rods;
   a receiving plate rotatably fixed to the lower end part of both said setting plates through a shaft;
   a switching mechanism fixed to one of said setting plates with a small distance from said receiving plate above thereof, and connected with said printing mechanism;
   a first swing plate secured at a shaft of said driving mechanism;
   a second swing plate secured through two connecting rods to said first swing plate; and
   two label transfer bars including coil springs rotatably mounted to the peripheries of said transfer bars secured at the lower end part of said other swing plate.

2. An electronic digital display scale with a label printer in accordance with claim 1, said label printer having said printing mechanism comprising a printing hammer, printing drum, roller for base paper, paper feed motor which feeds out roll paper in sequence, rubber printing mechanism, and having a guide plate for guiding said base paper so as to detach a printed label, a take-out opening provided at the center of the front face of said label printer frame to which said printed label is advanced, and said transfer bars are actuated by said driving mechanism comprising a rotary solenoid to swing said swing plate in reciprocation motion in the direction of said take-out opening and said label applying position where said receiving plate is movably provided to actuate said switching mechanism comprising a limit switch above said transfer bars thereby said printed label is adhered onto said coil springs being kept adhesive surface of the label faced down, and said limit switch is connected with said rotary solenoid and said printing mechanism.

3. An electronic digital display scale with a label printer in accordance with claim 1, wherein a receiving plate is provided a distance above said label transfer bar and wherein a printed label is inserted between said label transfer bar which stays at the label printer side and said receiving plate and is held and transferred by both the label transfer bar and the receiving plate toward the label applying position.

* * * * *